Feb. 8, 1938.  A. M. SAUER  2,107,586
GLARE SHIELD STRUCTURE
Filed Sept. 24, 1936   2 Sheets-Sheet 1
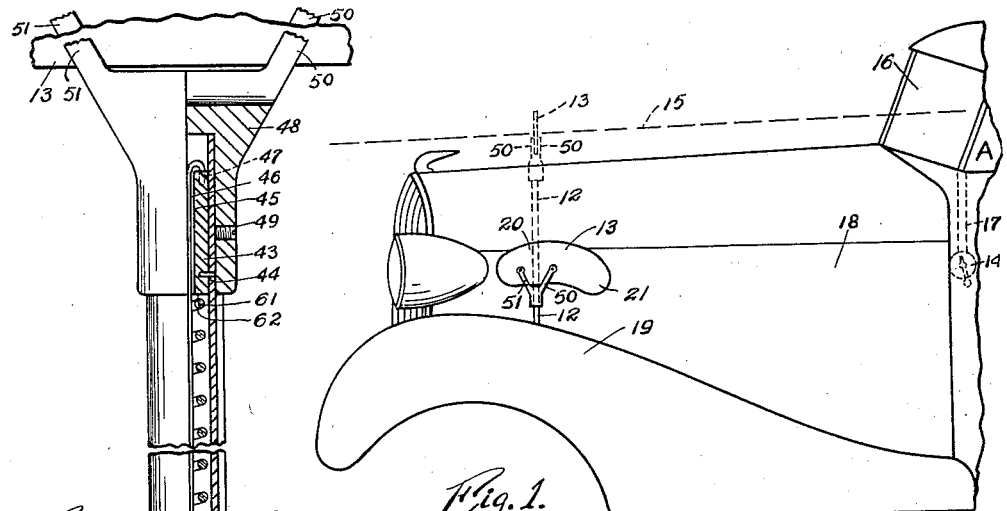
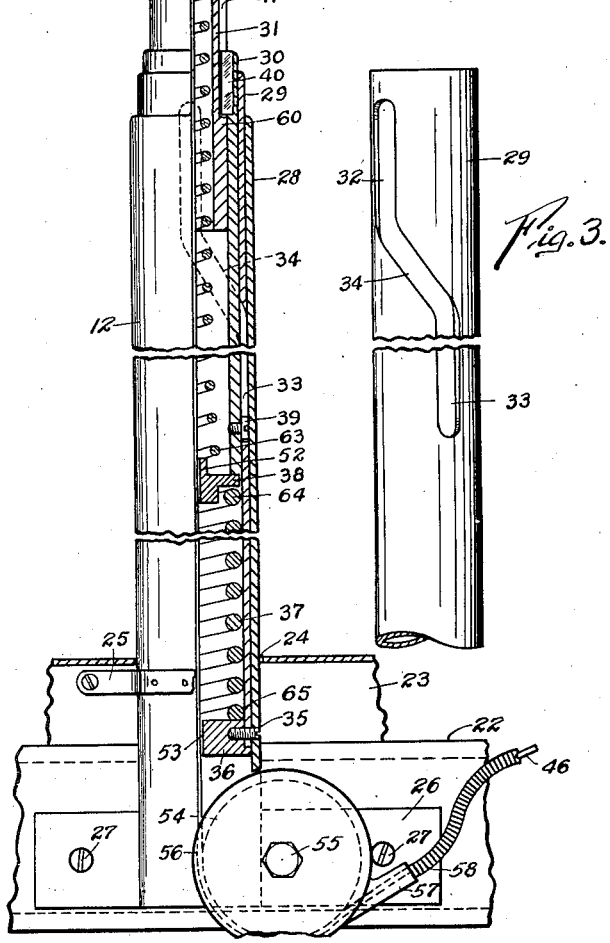
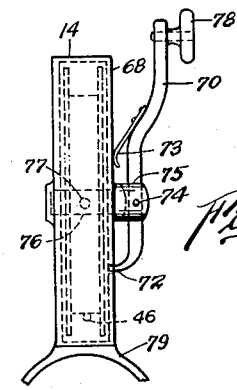
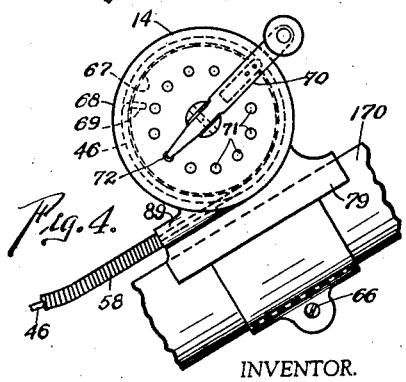
INVENTOR.
Anthony M. Sauer
BY Murray and Zugelter
ATTORNEYS

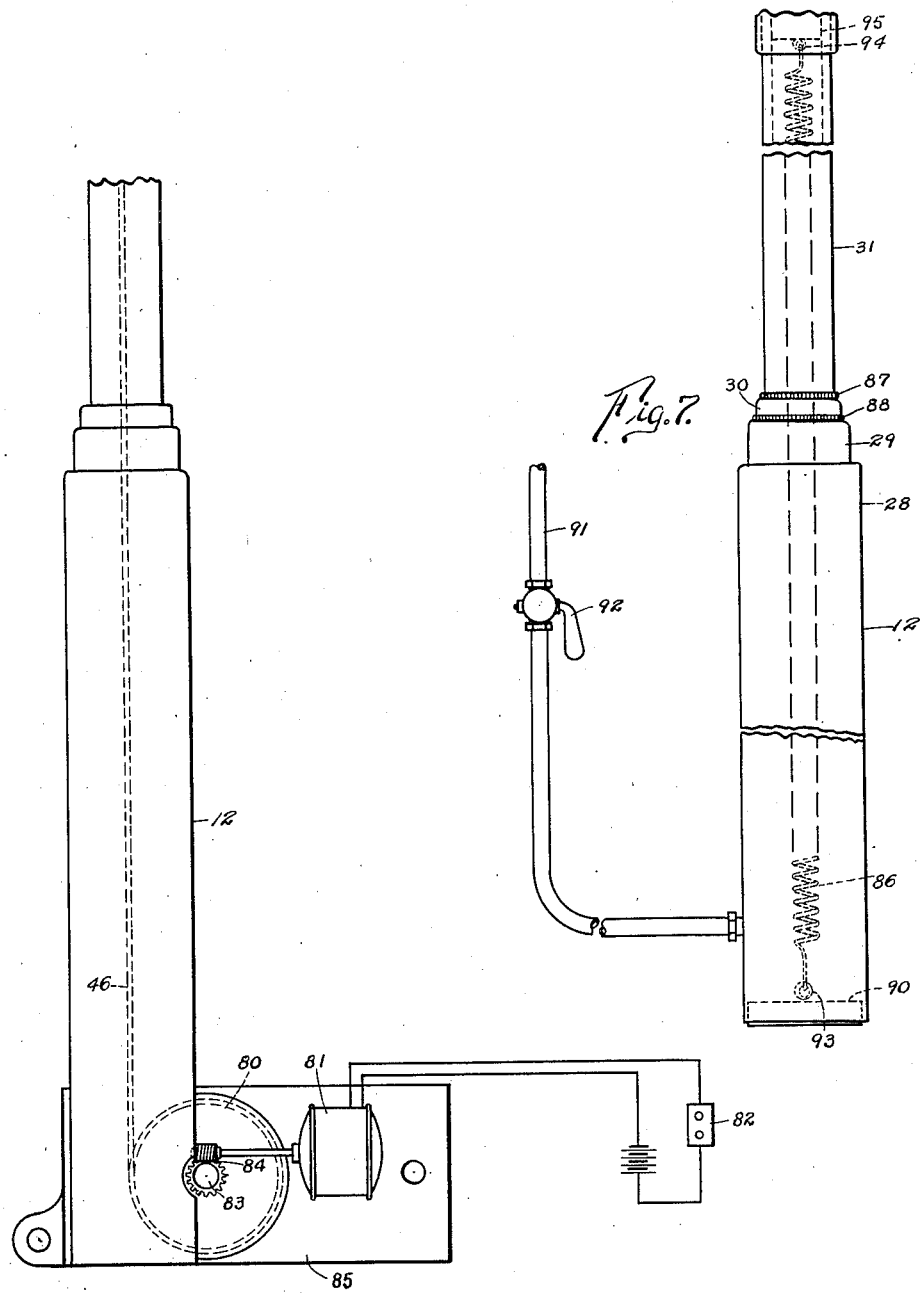

Patented Feb. 8, 1938

2,107,586

UNITED STATES PATENT OFFICE 2,107,586

GLARE SHIELD STRUCTURE

Anthony M. Sauer, Cincinnati, Ohio

Application September 24, 1936, Serial No. 102,267

8 Claims. (Cl. 296—97)

This invention relates to a glare shield structure for use on vehicles or carriers of passengers, freight, and the like.

An object of the invention is to provide an improved form of glare shield structure to be mounted near the forward portion of a vehicle, at a considerable distance from the driver's station, to screen the driver's eyes from the glare of headlights of an approaching vehicle.

Another object of the invention is to provide a glare shield structure of the character stated, with means controllable from the driver's station for displacement of the light screening element thereof to a normally inoperative position, at which position the structure is protected from possible injury and so located as to harmonize with the body lines of the vehicle upon which it is installed.

A further object of the invention is to provide mechanism associated with a light screen for the purpose stated, whereby the screen may be elevated to an operative position and automatically turned from a position of parallelism with the driver's line of vision, to a position at which the screen is transverse thereto, for intercepting objectionable light beams.

Another object is to provide a device of the character stated, which is so constructed and arranged as to enhance, rather than detract from, the appearance of a vehicle to which it is applied.

A still further object of the invention is to provide a light screen element embodying a novel improved configuration which enhances its utility.

The foregoing and other objects are attained by the means described herein and disclosed in the accompanying drawings, in which:

Fig. 1 is a fragmental side elevational view of a vehicle having the device of the invention installed thereon, and showing the operative and inoperative positions of the device.

Fig. 2 is a fragmental elevational view, half of which is in cross section, showing the details of a standard or extendable post embodying the invention.

Fig. 3 is a fragmental elevational view of a slotted tube which forms part of a means for rotating the light screen portion of the glare shield structure.

Fig. 4 is an elevational view of a manipulating or control means of the invention.

Fig. 5 is a slightly enlarged end view of the device disclosed in Fig. 4.

Figs. 6 and 7 are elevational views of two modifications.

In general, the invention consists in providing a telescopic standard or adjustable post 12 upon the upper end of which is fixed a light screen 13. The standard or post is adapted to be placed and fixed near the forward end of a vehicle, and on the same side thereof as the steering wheel. By means of a suitable manipulating or control device indicated generally by the character 14, the light screen may be elevated and turned at right angles to the line of sight 15 of a driver or operator who is located at the driver's station A, which is usually behind a windshield 16. The manipulating or control device may be fixed to any nearby stationary part of the vehicle, such as the instrument panel 17. Accordingly, it may be supported upon a steering post, such as 170.

In the preferred embodiment of the invention, the manipulating or control means is mechanical of nature, although it may be constructed to operate by vacuum, electricity, or fluid pressure, as desired, so long as it may be actuated from a location within the reach of the vehicle driver. Actuation of the means 14 results in disposing the light screen in either of two positions, namely, the inoperative position shown by full lines in Fig. 1, or the operative position indicated by the broken lines. In the inoperative position, the telescopic standard is lowered, and the light screen rests close to and in substantial parallelism with the body side 18 of the vehicle. The engine hood is considered a part of the vehicle body. The standard 12 preferably is so proportioned and arranged as to permit the screen to assume a position below the highest point of the hood, between the side 18 and the fender 19. This normal disposition of the screen affords protection against injury or destruction due to falling or projected objects and wind pressure, and at the same time places it in harmony with the streamline design of the vehicle body.

In the operative position of the light screen, the standard is extended upwardly a predetermined distance, and is turned at right angles to the line of vision of the vehicle driver, as shown. When in the operative position, the substantially horizontal portion or area 20 of the screen is employed to intercept undesirable rays of light from an approaching vehicle which is at some distance from the driver's eyes. As the on-coming vehicle approaches closer, however, the objectionable light rays of its headlights are lower and further to the left of the driver, so that it becomes convenient to utilize the contiguous downwardly directed offset portion or area 21 for blotting out the objectionable light rays. The screen 13 may be either opaque, or translucent to the extent of rendering unobjectionable the glare intensity of approaching vehicle lights.

It may be stated that the control of the light screen preferably is such that the standard 12 is first elongated or extended part way from its lower limit to afford the screen an opportunity to clear the hood and fender, and thereafter, the screen is rotated approximately ninety degrees. The rotational movement of the screen occurs, and is completed, before the screen reaches its upper limit of movement, so that the final few inches of elevating movement of the standard serves to adjust the height of the screen after the screen has been rotated through the full ninety degrees of rotation. Thus, the operator or driver of the vehicle may, in one operation, elevate the screen, rotate it to the operative position, and adjust its height relative to his line of vision. The line of vision may be intercepted anywhere between the position of the screen immediately after its rotation, and the extreme upper limit of extension of the standard or post 12, depending upon the driver's height or the height of the vehicle seat occupied by him.

The description will now proceed with reference to the structural details of the device.

In Fig. 2, the character 22 indicates the frame of a vehicle carrying a fender, a portion of the latter being indicated at 23. The fender may be drilled or apertured as at 24 to receive the lower end of the telescopic standard or post 12, and when necessary, a suitable bracket 25 may be provided for securing the standard or post to the fender. A second bracket 26 which is fixed relative to the standard or post, may be bolted, screwed, or otherwise fastened to the vehicle frame as at 27. The form and configuration of the bracket means may vary in different installations, wherefore it is to be understood that said means may be shaped or formed to suit the individual circumstances.

The telescopic standard or adjustable post 12 preferably is made up of a series of interfitting tubes indicated by the reference characters 28, 29, 30, and 31. The tube 28 may be considered the housing for the working parts of the standard, and it is this tube which bears a connected relationship with the body of the vehicle. Tube 29, referred to as the inner fixed guide tube, is detailed in Fig. 3, and as shown, it is provided with an elongated guide slot comprising the upper and lower straight axial portions 32 and 33, respectively, connected by an intermediate transverse cross-slot portion 34. The upper and lower straight axial portions 32 and 33 are substantially parallel with the axis of tube 29, and are located at substantially a ninety degree arc space in the wall of the tube. As the slot portions 32 and 33 are connected by the intermediate slot portion 34, the guide slot as a whole is continuous. The tube 29 which carries the guide slot, is fixed interiorly of the housing tube 12 in any suitable manner, such as by means of one or more set screws or fasteners 35, which secures in place also a disc or abutment 36 for the lower end of a compression spring 37 contained within the tube 29. The lower end of said spring seats upon the disc or abutment 36 so as to constantly exert a force upon an intermediate disc or abutment 38 which is slidably supported within the inner fixed guide tube 29.

Slidably received in the fixed guide tube 29 is the rotatable extension tube 30 which rests upon the intermediate disc or abutment 36, and which has fixed near its lower end a projection or follower 39 adapted to ride in the slot of the guide tube 29. The projection or follower may be of any suitable design, it being disclosed herein as a screw having a head received in the slot of the guide tube. From the foregoing, it will be understood that an elevational movement of the rotatable extension tube 30 will result in an initial non-rotating upward extension thereof as determined by the lower straight axial portion 33 of the guide slot, said movement being followed by a partial rotational movement determined by the intermediate transverse cross slot 34, and finally, when the projection or follower 39 reaches the upper straight axial portion 32, the extension tube 30 will again be projected upwardly without further rotational movement. This function of the guide slot and its cooperating follower 39, is responsible for the desirable previously described mode of disposing the light screen 13 in the operative position. That is to say, the light screen is first projected upwardly a proper distance to afford it an opportunity to clear the hood and fender, and thereafter continue its elevational movement. In order that the innermost tube 31 which supports the light screen 13 will rotate concurrently with the tube 30, a key 40 is rigidly fixed to the tube 30 and arranged to ride in a longitudinal key way 41 of the innermost tube 31. The tube 31 is slidably received within the tube 30, but because of the action of the key 40, it cannot rotate relatively thereto. The upper end of tube 31 is provided with a plug 43 that may be pinned or otherwise fixed to said tube as at 44, and said plug is drilled as at 45 to permit a wire or cable 46 to pass therethrough, and preferably to reach the upper end of the plug where it is suitably anchored as at 47 to the plug and to tube 31. This particular means of anchoring the upper end of the wire or cable at 47 is not material to the invention, and the anchorage may be secured in any other suitable manner. The means disclosed, however, possesses the advantage that the light screen bracket 48 may be removed from the upper end of the tube 31 without disturbing the anchorage at 47 upon the mere loosening of a set screw or other suitable fastening device 49. As will readily be understood, the light screen bracket has pairs of arms 50—50 and 51—51 adapted to embrace therebetween the light screen element 13. Further details of the bracket are deemed unnecessary as this part may be constructed to suit the individual tastes of the designers.

It will be noted that the wire or cable 46 extends from the point of anchorage 47, downwardly through the bore 45 of plug 43, thence through the similar bores 52 and 53 of the discs or spring abutments 38 and 36, respectively. After passing through these transverse elements of the structure, the wire or cable is guided over a pulley or other suitable anti-friction guide means 54 supported in fixed relationship to the mounting bracket 26. The pulley may rotate upon a bolt or stud 55 that passes through the housing 56 of the pulley. At a convenient location on the periphery of the housing 56, there is provided a bored extension 57 adapted for the attachment of a flexible conduit member 58 which leads the wire or cable 46 to a suitable manipulating or control device such as 14 located at or near the driver's compartment or station A. As will be understood, movement of the wire or cable 46 through the flexible conduit 58 will effect elevating and lowering movements of the light screen due to the telescopic action of the movable tubes 30 and 31.

At this point in the description, it may be stated that the compressive forces of the helical springs 37 and 59 are so related that the innermost tube 31 will elevate to its upper limit of travel, as determined by the abutment 60, before the second telescopic tube 30 begins to elevate. The upper end 62 of the compression spring 59 abuts the plug 43 at 61, whereas the lower end thereof 63 abuts the intermediate disc 38. The upper and lower ends 64 and 65, respectively, of spring 37, are held in restraint by the discs or abutments 38 and 36. When the wire or cable 46 is pulled or drawn outwardly of the pulley extension or nipple 57, the relative movement of the telescopic tubes is reversed, that is, tube 30 will reach its lower limit of travel before a retracting of the tube 31 occurs.

The necessary manipulation of the wire or cable 46 may be acomplished in various ways, it being preferable to wind the wire or cable upon a spool or reel either by hand or motive power, so long as the manipulations may be controlled from the driver's station. In Figs. 4 and 5, there is illustrated a hand-operated spool or reel, referred to generally as a manipulating or control means, such as will accomplish the desired manipulation of the wire or cable. The manipulating means illustrated is of the type that may be secured to a steering column 170 in any suitable manner, such as by means of a securing band or bracket 66. The reel or spool, indicated at 67, may be enclosed in a suitable housing 68 which includes a bored nipple or sleeve 89 that supports the upper end of flexible conduit 58 and receives the wire or cable. The inner end of the wire or cable is to be anchored to the spool or reel at 69, so that by rotating the crank 70, the wire or cable may be either wound in or paid out. Inasmuch as the force of springs 59 and 37 tends always to pay out the wire or cable from the spool 67, it is desirable to provide a clutch or stop mechanism to the handle or crank 70, so that the shield may be maintained in predetermined adjusted positions relative to the line of sight of the driver as indicated at 15 of Fig. 1. One of a number of suitable clutching means is disclosed in Figs. 4 and 5, wherein the character 71 indicates a series of apertures, notches or abutments, provided in circular formation upon the exterior of the housing 68, and adapted to be selectively engaged by a cooperative finger or extension 72 of the crank or handle 70. The finger or extension 72 normally is maintained in engagement with a selected stop 71, by the action of a spring 73 which is fixed to the crank or handle and arranged to frictionally contact the outer face of the reel or spool housing. The simplest form of yielding means is believed to be the leaf spring indicated at 73, but the construction should be understood to suggest the use of other forms of yielding means for performing the intended function of spring 73.

As is most clearly disclosed in Fig. 5, the crank or handle 70 is adapted to be rocked about a pivot pin 74 which connects the crank or handle to the outer end 75 of the reel or spool shaft 76. The outer end 75 of the shaft preferably is bifurcated or slotted to accommodate the crank or handle. The reel or spool is pinned or otherwise fixed to shaft 76 as indicated at 77. A suitable finger piece 78 is provided on the free end of the crank or handle 70. Thus, by applying force to the finger piece 78 in the direction of the housing 68, the finger or extension 72 of the crank or handle may be withdrawn from the stops 71, permitting rotation of the shaft and its associated reel or spool. By providing a proper number of stops or apertures 71, the elevation of the light shield 13 may be adjusted with the necessary accuracy, to accommodate the line of sight of individual vehicle operators or drivers. When the manipulating or control means of Figs. 4 and 5 is to be applied to a steering post, a suitable saddle or bearing 79 may be furnished, or may be made an integral part of the housing 68.

In the modified form of the device disclosed in Fig. 6, the telescopic standard or post corresponds to that of Fig. 2, but the actuating wire or cable 46 is adapted to be wound upon a reel or spool 80 which is power rotated by means of a motor 81. Any suitable means may be employed for power rotating the spool or reel 80 in opposite directions of rotation, the means shown being an electrical motor of the reversible type, controlled by a reversing switch 82 and imparting its rotation to the shaft 83 of the reel or spool through the medium of a worm and pinion gear 84. The motor and the spool or reel may be mounted upon the bracket 85 as a unit to be attached to the vehicle frame.

In the Fig. 7 modification, the extendable post or telescopic standard 12 is structurally the same as that of Fig. 2, except that the compression springs shown in the Fig. 2 device are replaced by a tension spring 86 which tends always to lower or collapse the post. Moreover, the entire structure is made fluid-tight by providing packing glands at the locations 87 and 88, and by inserting a plug 90 in the bottom of the standard. By thus modifying the structure, it is possible to actuate the telescopic post by means of fluid pressure conveyed thereto through a pipe or conduit 91 having a valve 92 interposed. The valve is adapted to be under the control of the driver, either by placing it at the driver's station or by furnishing a suitable actuating means for the valve handle. The spring 86 may have its lower end detachably anchored upon the plug 90 as at 93, while the upper end thereof is anchored at 94 to the plug 95 that closes the upper end of part 31. The packing means 87 and 88 preferably are of the well known adjustable type, so that the frictional resistance at 88 may exceed that at 87, to accomplish the desired result of having the post section 31 extended prior to an extending movement of the second telescopic post 30. To adapt the Fig. 7 device for operation by means of a vacuum, rather than by fluid pressure, the standard or post is to be rendered fluid-tight substantially as heretofore explained, while retaining the spring construction disclosed in Fig. 2. A vacuum applied to the lower end of the standard or post would serve to compress the springs and thereby lower the standard in substantially the manner in which it is lowered by means of the wire or cable 56.

It is to be understood that various modifications and changes may be made in the structural details of the device, within the scope of the appended claims, without departing from the spirit of the invention.

What is claimed is:

1. The combination with a motor vehicle having a driver's station behind the front end of the vehicle, of a glare shielding device comprising a light screen near the front end of the vehicle movable into the driver's line of vision for casting a shadow in the vicinity of the driver's station when the vehicle is approaching the headlights of an oncoming vehicle, and means including a retractable and extendable support for the light screen manipulatable from the driver's station, for elevating, lowering, and rotating the light screen selectively to parallelism with, or transverse relationship to, the driver's line of vision.

2. The combination with a motor vehicle having a front end and a body side extending longitudinally of the vehicle, with a driver's station located rearwardly of the front end of the vehicle, of a glare shielding device comprising a light screen near the front end of the vehicle movable into the driver's line of vision, and supporting means for said screen arranged to hold the screen in two positions, one of said positions being an operative position at which the screen is disposed transversely in the line of the driver's vision, and the other being an inoperative position at which the screen is disposed in substantial parallelism with the body side of the vehicle, and means controllable from the driver's station for moving the screen selectively to said operative and inoperative positions.

3. The combination with a motor vehicle having a front end and a driver's station located rearwardly of the front end of the vehicle, of a glare shielding device comprising a light screen, an extendable standard for supporting the screen, located at the front end of the vehicle and considerably forwardly of the driver's station, said standard comprising a plurality of relatively movable telescopic members, means fixing the screen relative to one of said members, and means associated with the telescopic members for rotating the screen as the telescopic members are adjusted longitudinally for establishing a required elevation of the screen.

4. The combination with a motor vehicle having a front end and a driver's station located rearwardly of the front end of the vehicle, of a glare shielding device comprising a light screen, an extendable standard for supporting the screen, located at the front end of the vehicle and considerably forwardly of the driver's station, said standard comprising a plurality of relatively movable telescopic members, means fixing the screen relative to one of said members, and a single control means actuatable for both adjusting the height of the standard, and rotating the light screen about the axis of the standard.

5. In a glare shielding device, the combination of a light screen and a support therefor comprising a plurality of relatively movable telescopic members, means fixing the light screen relative to one of said telescopic members, and a remote control for adjusting the position of the screen and including means associated with the telescopic members for rotating the screen as the telescopic members are adjusted longitudinally for establishing a required elevation of the screen.

6. In a glare shielding device, the combination of a light screen and a support therefor comprising a plurality of relatively movable telescopic members, means fixing the light screen relative to one of said telescopic members, and a remote control for adjusting the position of the screen and including a single means actuatable for both adjusting the height of the standard, and rotating the light screen about the axis of the standard.

7. In a device of the class described, the combination of a light screen, and an extendable standard therefor comprising a plurality of relatively movable telescopic members, means associated with one of said telescopic members for extending the standard various distances between upper and lower limits of travel, and means cooperating with the telescopic members to rotate one of them through a predetermined arc of rotation as the telescopic members are moved from one limit of travel to the other.

8. In a device of the class described, the combination of a light screen, and an extendable standard therefor comprising a plurality of relatively movable telescopic members, means associated with one of said telescopic members for extending the standard various distances between upper and lower limits of travel, and means cooperating with the telescopic members to rotate one of them through a predetermined arc of rotation, at an intermediate point between said limits of travel, as the telescopic members are moved from one limit of travel to the other.

ANTHONY M. SAUER.